United States Patent
Chen et al.

(10) Patent No.: US 6,483,726 B2
(45) Date of Patent: *Nov. 19, 2002

(54) AUXILIARY OUTPUT VOLTAGE CONTROL CIRCUIT OF FLYBACK POWER CONVERTER WITH A MAGNETIC AMPLIFIER

(75) Inventors: Wei Chen, Shanghai (CN); Jian Jiang, Shanghai (CN); Chau-Chun Wen, Shanghai (CN)

(73) Assignee: Delta Electronics, Inc., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/798,323

(22) Filed: Mar. 2, 2001

(65) Prior Publication Data

US 2002/0122326 A1 Sep. 5, 2002

(51) Int. Cl.[7] .............................................. H02M 3/335
(52) U.S. Cl. .................................................. 363/21.18
(58) Field of Search .............................. 363/21.18, 90, 363/91, 82; 307/31

(56) References Cited

U.S. PATENT DOCUMENTS

| | | | |
|---|---|---|---|
| 4,419,723 A | * 12/1983 | Wilson, Jr. .................. 363/82 |
| 4,881,014 A | * 11/1989 | Okochi ....................... 315/246 |
| 4,967,335 A | * 10/1990 | Konopka ...................... 363/82 |
| 5,619,403 A | * 4/1997 | Ishikawa et al. ............. 363/21.06 |

* cited by examiner

Primary Examiner—Shawn Riley
(74) Attorney, Agent, or Firm—Bo-In Lin

(57) ABSTRACT

A flyback power converter includes a transformer for transferring an input voltage from a primary side to a secondary side. The secondary side includes a main output voltage loop and at least one auxiliary output loop connected with a magnetic amplifier. A pulse width modulation (PWM) controller controls a switch on the primary side of the transformer for turning on the switch and turning off the main output voltage loop and the auxiliary output voltage loop for storing a magnetizing energy on windings of the secondary side. The PWM controller further turns off the switch and turning on the main output voltage loop for providing a main voltage output and for magnetizing the magnetic amplifier connected to the auxiliary output voltage loop. The magnetic amplifier functioning as an auxiliary-loop switch for turning on the auxiliary output voltage loop when the magnetic amplifier is saturated with magnetization and turning off the main voltage output voltage loop for providing an auxiliary output voltage. A time-shared energy transfer mechanism is provided between the main output voltage loop and the auxiliary output voltage loop to fully utilize the entire duty cycle.

16 Claims, 4 Drawing Sheets

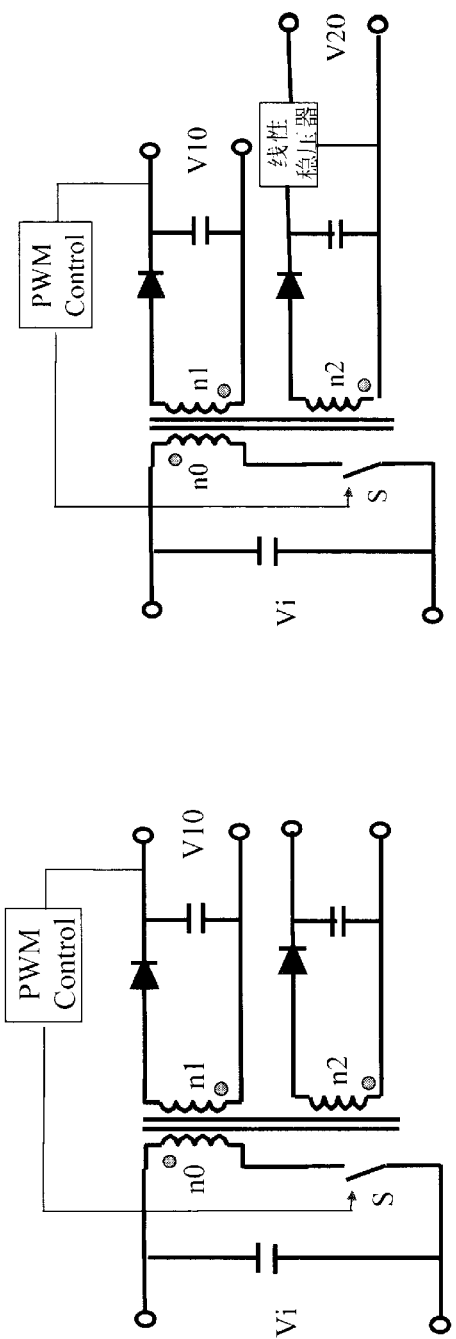
Fig. 1A (Prior Art)
Fig. 1B (Prior Art)
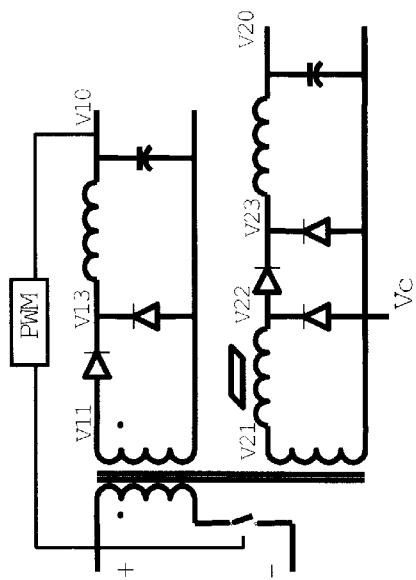
Fig. 1C (Prior Art)

AUXILIARY OUTPUT VOLTAGE CONTROL CIRCUIT OF FLYBACK POWER CONVERTER WITH A MAGNETIC AMPLIFIER

BACKGROUND OF THE INVENTION

1. Field of the Invention

This invention relates generally to the circuit and methods for configuring and operating a switching power converter. More particularly, this invention relates to an auxiliary output voltage control circuit of flyback power converter by the introduction of magnetic amplifier achieve simplified circuit, convenience of control, low production cost and precise auxiliary output voltage control.

2. Description of the Prior Art

Despite the advantages of simple circuit configuration and low production cost, conventional art of design and manufacture of a flyback converter is still limited by a technical difficulty of a larger fluctuation of auxiliary output voltage. For this reason, the flyback converters are typically implemented for systems operated at lower power below 150 watts. Additionally, the auxiliary output voltage in a flyback converter has a lower rate of adjustment relative to change of load. Due to a lower rate of adjustment to the change of the load, a linear integrating stabilizer is applied when a higher voltage stability is required for more precise control of the output voltage relative to the load changes. Such configuration is required even it is limited to system that has lower auxiliary output power. In order to overcome these limitations, more complicate circuits can be implemented and that causes a simple flyback converter to become more complicate thus losing the advantages that are inherent to a simpler configuration.

FIG. 1A is a circuit diagram for a flyback power converter where the auxiliary output is not controlled. The output voltages V10 and V20 depend on the numbers of winding n1 and n2 of the secondary side of the transformer. Specifically, the output voltages satisfy a condition:

$$V10/n1 = V20/n2 \qquad (1)$$

Since there is no feedback from the output voltages for adjusting and control, there is a poor sensitivity of the auxiliary output voltage in response to changes of the load voltage.

FIG. 1B shows a flyback power converter where a linear regulator is employed to control the auxiliary output voltage V20. Aided by the operation of the linear regulator, the auxiliary output voltage is more stable. However, such circuit configuration is suitable for application only on systems operated at a lower power range.

A magnetic amplifier is generally implemented in an auxiliary output voltage control for a forward converter as that shown in FIG. 1C. The energy transfer in a forward converter from the primary side to the secondary side carrying a load is achieved through the transformer under a condition of constant voltage. According to the duty cycle of the pulse width control circuit, a pulse width control performs the function of stabilizing the primary output voltage. When implemented with a magnetic amplifier, the forward converter has the advantages of simplified circuit and control mechanism as that shown in FIG. 1C. The forward converter with magnetic amplifier is also highly reliable with low electromagnetic interference. The function performed by the magnetic amplifier is to adjust the delay time in turning the magnetic amplifier from high impedance to low impedance by a feedback control for reset of the magnetic amplifier. The auxiliary output voltage is further adjusted by an averaging function performed by a output filtering inductor to provide stabilized output voltage. The delay time for turning magnetic amplifier to the low impedance is further controlled by a voltage-time integration of the magnetic amplifier. As the pulse width control circuit turns on the switch on the primary side, an energy transfer is achieved through the transformer under a constant voltage mode. The magnetic amplifier provides a major function of delaying the energy transfer to the auxiliary output side controlled by the magnetic amplifier feedback loop. Many disclosures and inventions have been made for implementing a magnetic amplifier in the forward converter. With a magnetic amplifier for controlling the auxiliary output voltage, excellent auxiliary output voltage adjustment to load variations are achieved. However, the forward converter has much more complicate circuit configuration than the flyback converter.

Therefore, a need still exists for those of ordinary skill in the art to provide a new and improved flyback power converter that can resolve the above-discussed technical limitations of a flyback power converter.

SUMMARY OF THE PRESENT INVENTION

It is therefore an object of the present invention to provide a novel and improved flyback power converter implemented with magnetic amplifier to effectively control the auxiliary output voltage to expand the range of application of the flyback power converter such that the above-mentioned limitations can be overcome.

Specifically, magnetic amplifiers are implemented together with a pulse width modulation controller. The PWM controller is applied to control the main output voltage and the magnetic amplifiers are used to control the auxiliary output voltage in a time-shared fashion such that stabilized output voltage is produced.

A flyback power converter is disclosed in this invention. The flyback power converter includes a transformer for transferring an input voltage from a primary side to a secondary side. The secondary side includes a main output voltage loop and at least one auxiliary output loop connected in series with a magnetic amplifier. A pulse width modulation (PWM) controller controls a switch on the primary side of the transformer for turning on the switch and turning off the main output voltage loop and the auxiliary output voltage loop for storing a magnetizing energy on windings of the transformer. The PWM controller further turns off the switch and turning on the main output voltage loop for providing a main voltage output and for magnetizing the magnetic amplifier connected to the auxiliary output voltage loop. The magnetic amplifier functioning as an auxiliary-loop switch for turning on the auxiliary output voltage loop when the magnetic amplifier is saturated with magnetization and turning off the main voltage output voltage loop for providing an auxiliary output voltage. A time-shared energy transfer mechanism is provided between the main output voltage loop and the auxiliary output voltage loop to fully utilize the entire duty cycle.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1A is a circuit diagram for showing a conventional flyback power converter without feedback control;

FIG. 1B is a circuit diagram for showing a conventional flyback power converter implemented with a linear stabilizer for controlling the auxiliary output voltage;

FIG. 1C is a circuit diagram for showing a conventional forward power converter implemented with magnetic amplifier for controlling the auxiliary output voltage;

DETAILED DESCRIPTION OF THE INVENTION

Figure 2:
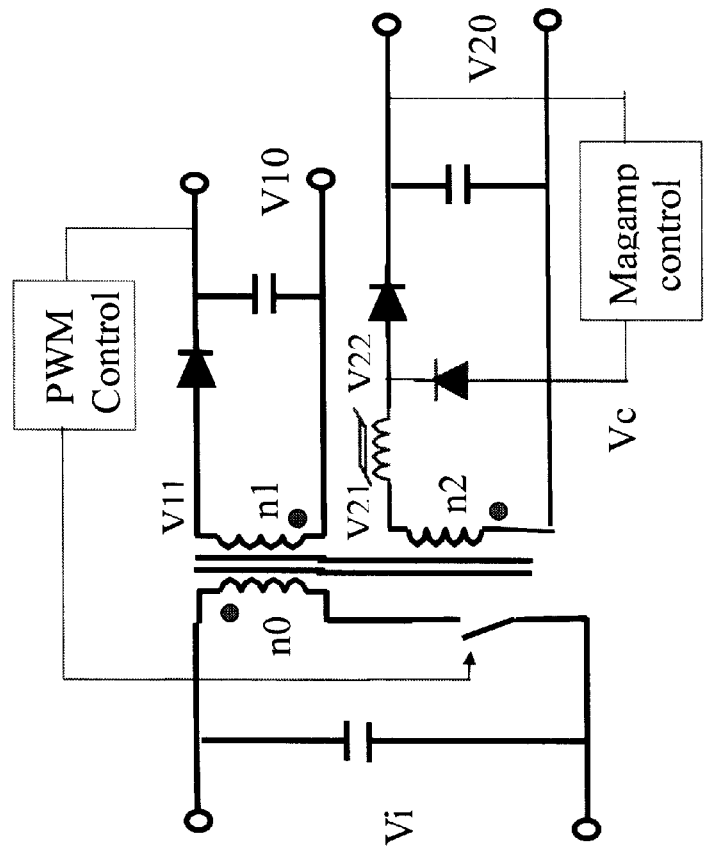
FIG. 2 is a circuit diagram for showing an improved flyback power converter implemented with magnetic amplifier for controlling the auxiliary output voltage.

Referring to FIG. 2 for a flyback power converter of this invention wherein a transfer of energy is carried out from the primary side of a transformer to the secondary side under a constant current condition. The energy transfer is carried out when the main switch S on the primary side is turned off. When the switch S is turned off, the energy stored in the magnetizing inductor during the time when the switch is turned on is transferred to the secondary side through the transformer. Unlike the forward converter, there is no inductor on the output loop to provide an average output voltage. The output voltage is determined by the ratio of the number of windings of the transformer coils connected to the primary output and the auxiliary output, therefore, the function carried out by the magnetic amplifier is different from the magnetic amplifier of a forward power converter. The energy transfer carried out by the flyback power converter of this invention as that shown in FIG. 2 is performed with a time-share technique according to the wave-forms as that shown in FIG. 3. For the purpose of achieving the function of time-shared energy transfer, a ratio of the voltage to number of coil windings for the main output circuit is set higher than that of the auxiliary output. Specifically, $$(V110/n1) > (V120/n2) \tag{2}$$

Figure 3:
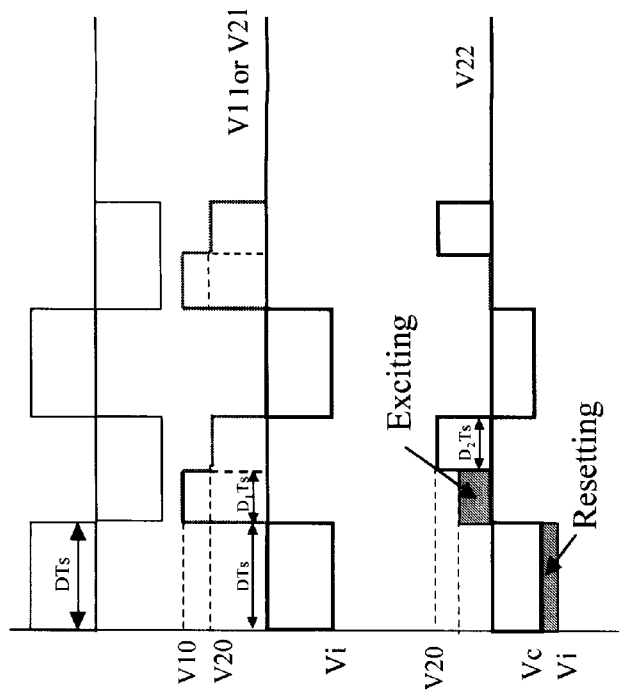
FIG. 3 provides time sequence diagrams for showing voltage variations between the time-shared main output voltage loop and the auxiliary output voltage loop of FIG. 2.

Suppose that the duty cycle of the pulse width modulator (PWM) control is D. As the PWM control is employed for controlling the on/off of the main switch. In response to the on/off of the main switch S, the magnetic amplifier is turned off and on respectively to provide a high and low impedance to achieve the time-shared energy transfer to the output voltages V110 and V120 thus stabilizing the main output voltage. Referring to FIG. 3, when the main switch S is turned on during the D*Ts time-segment, the magnetizing inductance in windings n0 on the primary side of the transformer accumulates energy from the input voltage. Meanwhile, the magnetic amplifier is turned off, having a high impedance and reset magnetically in this time segment. In the time segment D1*Ts right after the main switch S is turned off, the main output loop across the output voltage V110 becomes conductive. And, in this time-segment, a voltage difference [V110*(n2/n1)–V120] is available for magnetization of the magnetic amplifier for storing a magnetization energy in the amount of [V110*(n2/n1)–V120]*D1*Ts. Once the magnetic amplifier is saturated, the magnetic amplifier turn into a low impedance mode and the auxiliary output loop becomes conductive. As the voltage V120/n2 is lower than V110/n1 (see equation 2), the diode on the auxiliary loop across the main output across the main output V110 is turned off by the reverse biased voltage difference. Therefore, in a time segment D2*Ts followed the time segment D1*Ts, the only output energy are provided from the loop across the auxiliary output voltage V120. By controlling the timing D1*Ts for resetting the magnetic amplifier, with the magnetic amplifier control, the output voltage can be precisely controlled. According to above sequence, an equation that represents the energy transfer is:

$$(Vi/n0)*D*Ts = (V110/n1)*D1*Ts + (V120/n2)*D2*Ts \tag{3}$$

Where D=D1+D2. Thus, a dual output loop controlled by pulse width modulator (PWM) controller and magnetic amplifier controller are provided.

Figure 5:
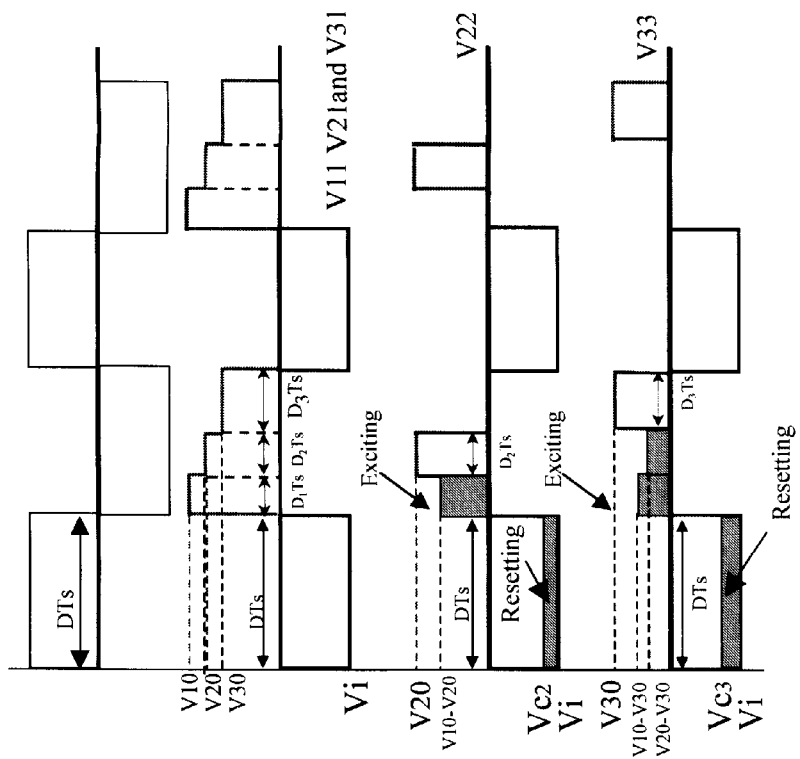
FIG. 5 provides time sequence diagrams for showing voltage variations between the time-shared main output voltage loop and two auxiliary output voltage loops of FIG. 4.
Figure 4:
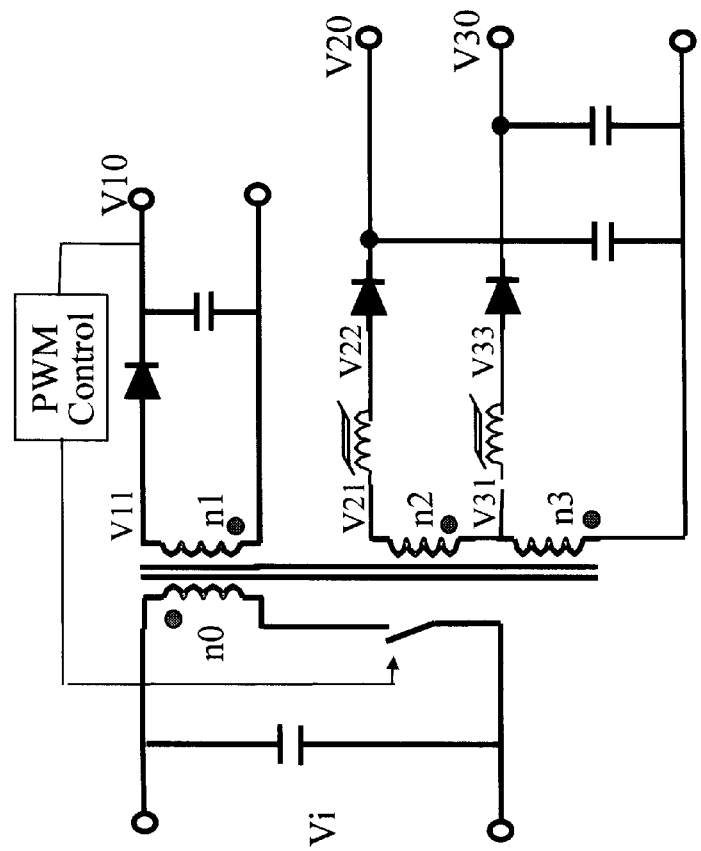
FIG. 4 is a circuit diagram for showing an improved flyback power converter implemented with two magnetic amplifiers for controlling two auxiliary output loops.

Referring to FIG. 4 for another flyback power converter of this invention wherein two magnetic amplifiers are employed to configure a flyback power converter 300. The power converted is operated with one main output voltage represented by V210 and two auxiliary voltage outputs represented by V220 and V230. The voltage variations and time sequences of operations are illustrated in FIG. 5. The main output voltage V210 is controlled by the PWM controller and the auxiliary output voltages V220 and 230 are controlled by the magnetic amplifiers each connected to the auxiliary output loop.

Similar to the working principles described for FIGS. 2 and 3, the power transfer of energy is carried out from the primary side of the transformer to the secondary side under a constant current condition. The energy transfer is carried out when the main switch S on the primary side is turned off. When the switch S is turned off, the energy stored in the magnetizing inductance during the time when the switch is turned on is transferred to the secondary side through the transformer. For the purpose of achieving the function of time-shared energy transfer, a ratio of the voltage to number of coil windings for the main output circuit is set higher than that of the first and the second auxiliary outputs. Specifically, $$(V210/n1) > (V220/n2) > (V230/n3) \tag{4}$$

Suppose that the duty cycle of the pulse width modulator (PWM) control is D. As the PWM control is employed for controlling the on/off of the main switch, in response to the on/off of the main switch S, the magnetic amplifiers are turned off on respectively. A high and a low impedance are produced respectively to achieve the time-shared energy transfer to the output voltages V210, V120 and V310 thus stabilizing the main output voltage. Referring to FIG. 5, when the main switch S is turned on during the D*Ts time-segment, the inductive windings n0 on the primary side of the transformer accumulates energy from the input voltage. Meanwhile, the magnetic amplifiers are turned off, having a high impedance. The magnetic amplifiers are reset magnetically in this time segment. In the time segment D1*Ts right after the main switch S is turned off, the main output loop across the output voltage V210 becomes conductive.

And, in this time-segment, two differential voltages [V210*(n2/n1)–V220], and [V210*(n3/n1)–V230] are available for magnetization of the first and the second magnetic amplifiers for storing a magnetization energy in the amount of [V210*(n2/n1)−V220]*D1*Ts, and [V210*(n3/n1)−V230]*D1*Ts. Once the first magnetic amplifier is saturated, the first magnetic amplifier turn into a low impedance mode and the first auxiliary output loop becomes conductive. As the voltage V220/n2 is lower than V210/n1 (see equation 3), the diode on the auxiliary loop across the main output across the main output V210 is turned off by the biased voltage difference. Therefore, in a time segment D2*Ts followed the time segment D1*Ts, the only output energy are provided from the loop across the first auxiliary output voltage V220.

In this time segment, the magnetization operation is continued on the second magnetic amplifier with a magnetizing voltage of [V220*(n3/n2)−V230]. Once the second magnetic amplifier is saturated, the second magnetic amplifier turns into a low impedance mode and the loop connected to the second magnetic amplifier becomes conductive. Because the voltage V230/n3 is lower than V210/n1 and V220/n2, the diode on the main output loop and on the first auxiliary loop are turned off. In a time segment D3*Ts, the only output energy is provided from the loop across the second output voltage V330. By controlling the lengths of time D1*Ts and D2*Ts for resetting the magnetic amplifiers with the magnetic amplifier control, the output voltage can be precisely controlled. According to above sequence, an equation that represents the energy transfer is:

$$(Vi/n0)*D*Ts = (V210/n1)D1*Ts + (V220/n2)*D2*Ts + (V230/n2)*D3*Ts \quad (5)$$

Where D=D1+D2+D3. Thus, triple output loops controlled by a pulse width modulator (PMW) controller and two magnetic amplifier controllers are provided.

For the purpose of satisfying the conditions of Equations (2) or (4), the circuit of the secondary side must be particularly designed. Circuit configurations can be implemented according to FIGS. 6A, 6B and 6C. In FIG. 6A, the secondary side 305 of the converter 300 comprises three transformer windings 310, 320, and 330, each has different number of windings n310, n320, and n330 respectively. The number of windings can be flexibly adjusted to satisfy the condition of:

$$(V310/n310) > (V320/n320) > (V330/n330) \quad (6)$$

Since the number of windings n310, n320, and n330 can be flexibly adjusted, there is more flexibility in the design of the circuit of the secondary side.

Figure 6B:
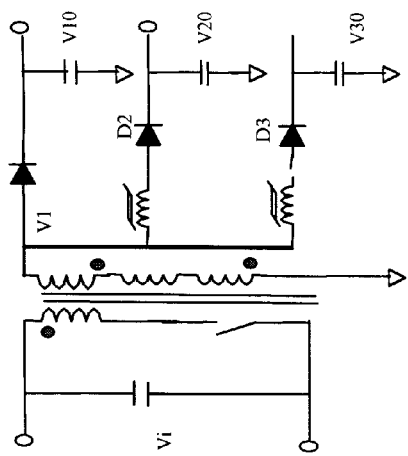
FIGS. 6A to 6C are circuit diagrams for showing three different circuit implementations for configuring an improved flyback power converter that employs two magnetic amplifiers for controlling two auxiliary output loops.
Figure 6C:
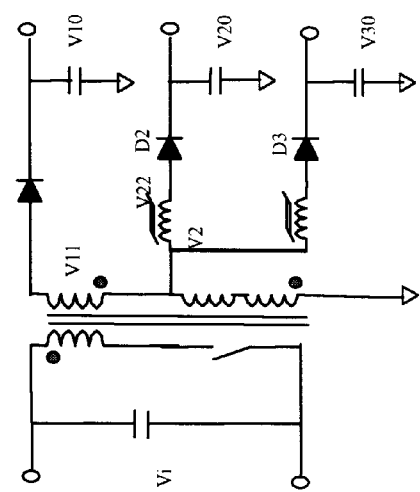
Figure 6A:
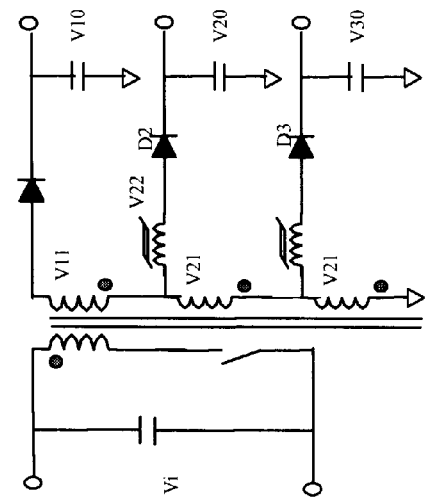

In FIG. 6B, the secondary side 355 of the converter 350 comprises only one secondary winding. Therefore, n1=n2=n3 for the number of windings as that listed in Equation (4). For the purpose of satisfying a condition of Equation (4), it is required that V360>V370>V380 as that shown in FIG. 6B. Less flexibility for circuit design is available because the number of windings of the secondary side is fixed as a constant once the design of the transformer is determined. In FIG. 6C, the secondary side 405 of the flyback power converter 400 comprises two windings each has a number of windings of n410 and n420 respectively. The condition set in Equation (4) now becomes:

$$(V410/n410) > (V420/n420) > (V430/n420) \quad (7)$$

The number of windings n410 and n420 can be adjusted together with the parameters of other circuit elements to achieve the condition set in Equation (7).

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A flyback power converter comprising:
   a transformer for transferring an input voltage from a primary side to a secondary side;
   said secondary side includes a main output loop and at least one auxiliary output loop connected in series with a magnetic amplifier;
   a pulse width modulation (PWM) controller controlling a switch on said primary side of said transformer for turning on and off said switch and turning off and on said main output loop respectively in synchronization with said switch;
   said auxiliary output voltage loop further includes a magnetic amplifier controller for controlling a magnetization saturation and reset of said magnetic amplifier in synchronization with an on-off sequence of said main output loop followed by an on-off sequence of said auxiliary output loop during a time-period when said switch is off and for providing a stabilized auxiliary output loop voltage depending on said magnetization saturation and reset of said magnetic amplifier.

2. The flyback power converter of claim 1 wherein:
   said main output loop coupled to a main transformer-winding having N0 turns for providing an main output voltage V0 where N0 and V0 are real numbers; and
   said auxiliary output loop coupled to an auxiliary transformer-winding having N1 turns for providing an auxiliary output voltage V1 where N1 and V1 are real numbers and (V0/N0)>(V1/N1) for providing a magnetizing voltage of [V0(N1/N0)−V1] to said magnetic amplifier.

3. The flyback power converter of claim 2 further comprising:
   a second auxiliary output voltage loop coupled to a second auxiliary transformer-winding having N2 turns for providing an auxiliary output voltage V2 where N2 and V2 are real numbers and (V0/N0)>(V1/N1)>(V2/N2) for providing a magnetizing voltage of [V0(N1/N0)−V1] to said magnetic amplifier and a magnetizing voltage of [V1(N2/N1)−V2] to a second magnetic amplifier connected in series on said second auxiliary output voltage loop.

4. A flyback power converter comprising:
   a transformer for transferring an input voltage from a primary side to a secondary side;
   said secondary side includes a main output loop and at least one auxiliary output loop connected in series with a magnetic amplifier;
   a pulse-width modulation controller for controlling and synchronizing operation sequences of said transformer and said main output loop; and
   said auxiliary output voltage loop further includes a magnetic amplifier controller for controlling a magnetization saturation and reset of said magnetic amplifier in synchronization with an on-off sequence of said main output loop followed by an on-off sequence of said auxiliary output loop during a time-period when said transformer is turned off and for providing a stabilized auxiliary output loop voltage depending on said magnetization saturation and reset of said magnetic amplifier.

5. The flyback power converter of claim 4 further comprising:

a switch on said primary side controlled by said pulse width modulation (PWM) controller applying a feedback of an output voltage of said main voltage output loop and said magnetization saturation and reset of said magnetic amplifier for controlling an effective duty cycle for switching on and off said transformer for controlling an output voltage from said main output loop.

6. The flyback power converter of claim 5 wherein:

said secondary output voltage loop imposing a magnetizing voltage on said magnetic amplifier for magnetizing and resetting said magnetic amplifier for turning on said auxiliary output voltage loop as said magnetic amplifier is saturated with magnetization for providing an auxiliary output voltage and for simultaneously turning off said main voltage output voltage loop.

7. The flyback power converter of claim 6 wherein:

said main output loop coupled to a main transformer-winding having N0 turns for providing an main output voltage V0 where N0 and V0 are real numbers; and said auxiliary output loop coupled to an auxiliary transformer-winding having N1 turns for providing an auxiliary output voltage V1 where N1 and V1 are real numbers and (V0/N0)>(V1/N1) for providing a magnetizing voltage of [V0(N1/N0)−V1] to said magnetic amplifier.

8. The flyback power converter of claim 7 further comprising:

a second auxiliary output voltage loop coupled to a second auxiliary transformer-winding having N2 turns for providing an auxiliary output voltage V2 where N2 and V2 are real numbers and (V0/N0)>(V1/N1)>(V2/N2) for providing a magnetizing voltage of [V0(N1/N1)−V1] to said magnetic amplifier and a magnetizing voltage of [V1(N2/N1)−V2] to a second magnetic amplifier connected in series on said second auxiliary output voltage loop.

9. A method for configuring a flyback power converter comprising:

employing a transformer for transferring an input voltage from a primary side to a secondary side;

disposing on said secondary side a main output loop and at least one auxiliary output loop connected in series with a magnetic amplifier;

controlling a switch on said primary side by employing a pulse width modulation (PWM) controller for turning on and off said switch and turning off and on said main output loop respectively in synchronization with said switch;

connecting a magnetic amplifier in said auxiliary output voltage loop and controlling a magnetization saturation and reset of said magnetic amplifier by employing a magnetic amplifier controller in synchronization with an on-off sequence of said main output loop followed by an on-off sequence of said auxiliary output loop during a time-period when said switch is off and for providing a stabilized auxiliary output loop voltage depending on said magnetization saturation and reset of said magnetic amplifier.

10. The method of claim 9 wherein:

said step of transferring energy from a primary side to a secondary side further comprising a step of coupling a main transformer-winding of said main output loop having N0 turns for providing an main output voltage V0 where N0 and V0 are real numbers; and said step of transferring energy from a primary side to a secondary side further comprising a step of coupling an auxiliary-transformer-winding having N1 turns for providing an auxiliary output voltage V1 where N1 and V1 are real numbers and (V0/N0)>(V1/N1) for providing a magnetizing voltage of [V0(N1/N0)−V1] to said magnetic amplifier.

11. The method of claim 10 further comprising:

said step of transferring energy from a primary side to a secondary side further comprising a step of coupling a second auxiliary output voltage loop having a second auxiliary transformer-winding having N2 turns for providing an auxiliary output voltage V2 where N2 and V2 are real numbers and (V0/N0)>(V1/N1)>(V2/N2) for providing a magnetizing voltage of [V0(N1/N0)−V1] to said magnetic amplifier and a magnetizing voltage of [V1(N2/N1)−V2] to a second magnetic amplifier connected in series on said second auxiliary output voltage loop.

12. A method for configuring flyback power converter comprising:

employing a transformer for transferring an input voltage from a primary side to a secondary side;

disposing on said secondary side a main output loop and at least one auxiliary output loop connected in series with a magnetic amplifier;

employing a pulse-width modulation controller for controlling and synchronizing operation sequences of said transformer and said main output loop; and disposing on said auxiliary output voltage loop a magnetic amplifier controller for controlling a magnetization saturation and reset of said magnetic amplifier in synchronization with an on-off sequence of said main output loop followed by an on-off sequence of said auxiliary output loop during a time-period when said transformer is turned off and for providing a stabilized auxiliary output loop voltage depending on said magnetization saturation and reset of said magnetic amplifier.

13. The method of claim 12 further comprising:

controlling a switch on said primary side by said pulse width modulation (PWM) controller applying a feedback of an output voltage of said main voltage output loop and said magnetization saturation and reset of said magnetic amplifier for controlling an effective duty cycle for switching on and off said transformer for controlling an output voltage from said main output loop.

14. The method of claim 12 further comprising a step of:

employing said secondary output voltage loop to impose a magnetizing voltage on said magnetic amplifier for magnetizing and resetting said magnetic amplifier for turning on said auxiliary output voltage loop as said magnetic amplifier is saturated with magnetization for providing an auxiliary output voltage and for simultaneously turning off said main voltage output voltage loop.

15. The method of claim 14 wherein:

said step of disposing on said secondary side a main output loop further comprising a step of coupling said main output loop to a main transformer-winding having $N0$ turns for providing an main output voltage $V0$ where $N0$ and $V0$ are real numbers; and said step of disposing on said secondary side an auxiliary output loop further comprising a step of coupling said auxiliary output loop to an auxiliary transformer-winding having $N1$ turns for providing an auxiliary output voltage $V1$ where $N1$ and $V1$ are real numbers and $(V0/N0)>(V1/N1)$ for providing a magnetizing voltage of $[V0(N1/N0)-V1]$ to said magnetic amplifier.

16. The method of claim 15 further comprising:

coupling a second auxiliary output voltage loop to a second auxiliary transformer-winding having $N2$ turns for providing an auxiliary output voltage $V2$ where $N2$ and $V2$ are real numbers and $(V0/N0)>(V1/N1)>(V2/N2)$ for providing a magnetizing voltage of $[V0(N1/N0)-V1]$ to said magnetic amplifier and a magnetizing voltage of $[V1(N2/N1)-V2]$ to a second magnetic amplifier connected in series on said second auxiliary output voltage loop.

* * * * *